United States Patent [19]

Verbos

[11] Patent Number: 5,140,247
[45] Date of Patent: Aug. 18, 1992

[54] CONTROL SYSTEM FOR POLYPHASE INDUCTION MACHINES

[75] Inventor: Stephen P. Verbos, Spring Lake, Mich.

[73] Assignee: Lift-Tech International, Inc., Muskegon, Mich.

[21] Appl. No.: 152,674

[22] Filed: Feb. 5, 1988

[51] Int. Cl.$^5$ .............................................. H02P 3/24
[52] U.S. Cl. .................................... 318/809; 318/778; 388/820; 388/857; 363/49; 323/901
[58] Field of Search ............... 318/778, 779, 807, 809; 323/901, 238, 321; 363/49; 388/820, 848, 857

[56] References Cited

U.S. PATENT DOCUMENTS

| | | | |
|---|---|---|---|
| 3,670,237 | 6/1972 | Hubel et al. | 318/778 |
| 4,100,469 | 7/1978 | Nelson et al. | 318/416 |
| 4,142,136 | 2/1979 | Witter | 318/416 |
| 4,361,793 | 11/1982 | Nordell | 318/778 |
| 4,384,243 | 5/1983 | Muskovac | 318/729 |
| 4,482,853 | 11/1984 | Bhavsar | 318/778 |
| 4,625,271 | 11/1986 | Chetty et al. | 323/901 |
| 4,672,880 | 2/1987 | Oshima et al. | 318/778 |

FOREIGN PATENT DOCUMENTS 0084317  5/1983  Japan ................................ 323/238

OTHER PUBLICATIONS

Bruce et al, "Reduced Voltage of Squirrel-Cage Induction Motors", IEEE Transactions on Industry Applications, vol. IA-20, No. 1, Jan./Feb. 1982, pp. 40-55.

Primary Examiner—William M. Shoop, Jr.
Assistant Examiner—John W. Cabeca
Attorney, Agent, or Firm—William J. Michals; James N. Videbeck

[57] ABSTRACT

A system for controlling the start-up sequence of an electric motor includes a contactor relay for supplying polyphase operating voltage to the motor. A plurality of output circuits are respectively coupled between the motor and the relay contacts. Each output circuit is responsive to an output control signal applied to an input thereof for applying the operating voltage to the motor. An acceleration ramp generator is responsive to a motor control circuit which energizes the relay for providing a first signal which gradually rises upon the initial activation thereof. A phase control ramp generator is responsive to the application of the polyphase operating voltage to provide a second signal which decreases from a given level upon the initial application of the operating voltage. A plurality of comparators are provided each comparator having first and second inputs respectively coupled to receive each phase control ramp generator signal and the acceleration ramp generator signal. Each comparator includes an output which provides a respective one of the output control signals when the level of the phase control ramp generator signal falls below the level of the acceleration ramp generator signal.

7 Claims, 3 Drawing Sheets

CONTROL SYSTEM FOR POLYPHASE INDUCTION MACHINES

BACKGROUND OF THE INVENTION

This invention relates to a start-up control circuit for a polyphase induction motor and, more particularly, to such a circuit which reduces the rate of initial acceleration of the motor and which reduces the start-up inrush of motor current.

Polyphase induction machines such as motors are well known and have been widely used in the art. The induction motor is one in which alternating current is supplied to the stator directly and to the rotor by induction or transformer action from the stator. The rotor in these machines may be one of two types, the most popular of which is the squirrel-cage rotor wherein its winding consists of conducting bars embedded in slots in the rotor iron and short-circuited at each end by conducting end rings. The extreme simplicity and ruggedness of the squirrel-cage construction are pronounced advantages of this type of induction motor. It has been found desirable in the use of these machines to reduce the voltage to the motor during start-up and thereafter increasing to full voltage during a running condition. Reducing this voltage serves a two-fold purpose. First, a reduction in the rate of acceleration of the motor and its load. For example, in the case of the use of such a motor as a power source for a crane trolley, reducing the rate of acceleration allows for smooth acceleration and minimizing the swing of the load. Similarly, when such motors are used on a conveyor, reducing the acceleration produces a more gradual acceleration which minimizes disturbance of products on the conveyor. Secondly, reduction of the applied voltage during motor start-up reduces current inrush in the motor. This has the advantage of minimizing or avoiding the dimming of lights in the motor environment during such start-up operation; and also reduces or avoids the need for over-sizing the power distribution system to accommodate this initial inrush of start-up motor current.

Control circuits for reducing the start-up current of a squirrel cage induction motor are known and have been used in the art. However, these known circuits have the disadvantages that the control circuit is not adequately isolated from the motor control inputs and therefore switching transients associated with the motor contactor relay coil can disadvantageously affect the control circuit. Further, these known control circuits allow the motor voltage applying contactor relay contacts to be applied to the load during the motor turn-off operation and thereby allow undesirable arcing of the relay contactor contacts during at least the initial portions of the off-period operation.

These and other disadvantages are overcome by the present invention wherein there is provided a control system for polyphase induction machines which provides start-up control and which provides isolation of the input of the control system from the motor control circuits and which removes the motor operating voltage from the motor load during off-period operation.

SUMMARY OF THE INVENTION

Briefly, a system for controlling the start-up sequence of an electric motor is provided. The system comprises means for supplying polyphase to operating voltage to the motor. A plurality of output circuits are respectively coupled between the motor and the means for supplying voltage. Each output circuit is responsive to an output control signal applied to an input thereof for applying the operating voltage to the motor. An acceleration ramp generator is responsive to a motor control circuit for providing a first signal which gradually rises upon the initial activation thereof. A phase control ramp generator is responsive to the application of the polyphase operating voltage to provide a second signal which decreases from a given level upon the initial application of the operating voltage. A plurality of comparators are provided each comparator having first and second inputs respectively coupled to receive each phase control ramp generator signal and the acceleration ramp generator signal. Each comparator includes an output which provides a respective one of the output control signals when the level of the phase control ramp generator signal falls below the level of the acceleration ramp generator signal.

BRIEF DESCRIPTION OF THE DRAWING

The advantages of this invention will become more readily appreciated as the same becomes completely understood by reference to the following detailed description when taken in conjunction with the accompanying drawing wherein.

DETAILED DESCRIPTION

Figure 1:
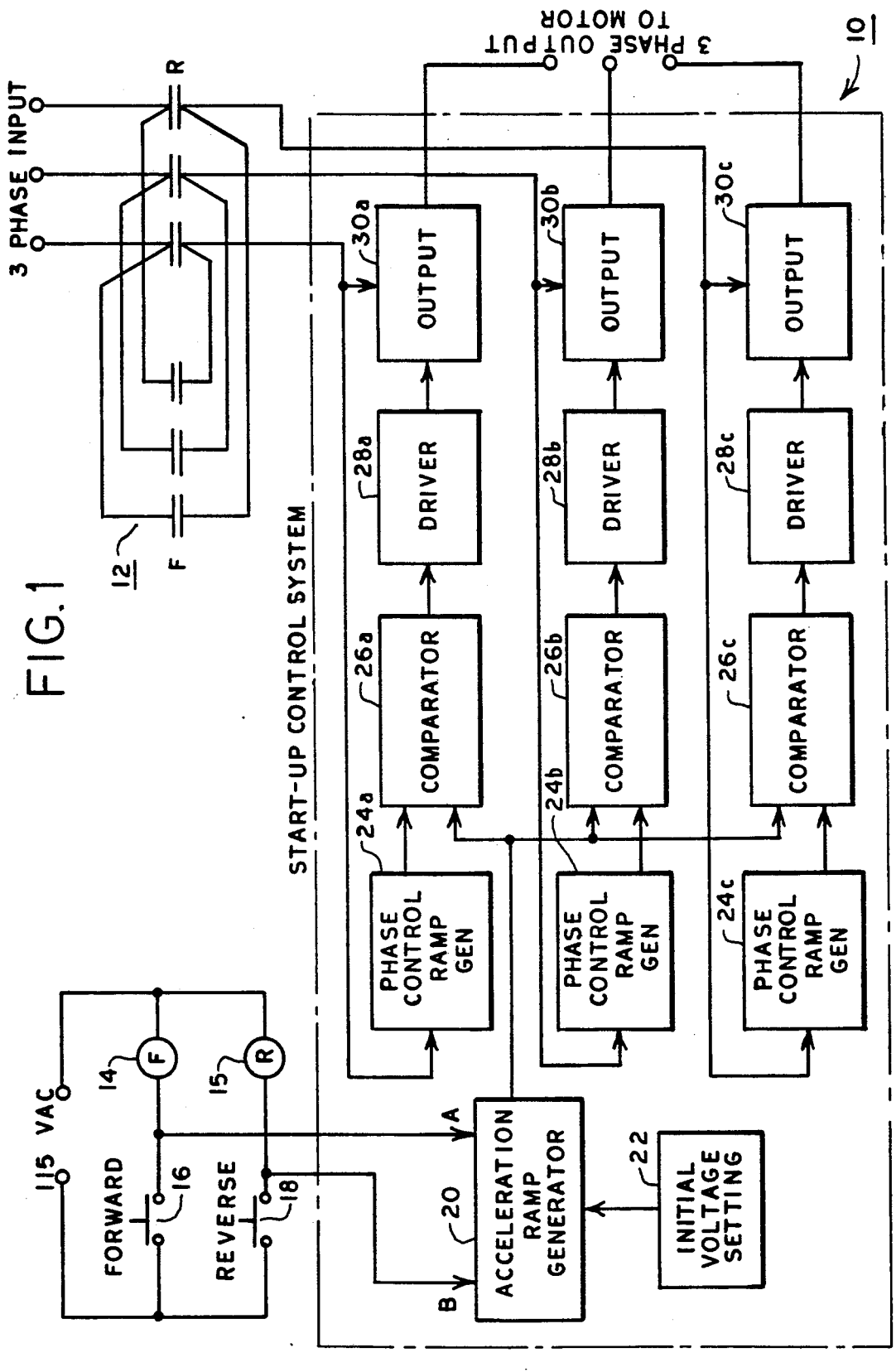
FIG. 1 is a combined block and schematic diagram of a control system for polyphase induction machines in accordance with the principles of the present invention.

Referring now to FIG. 1 there is shown generally at 10 a control system for polyphase induction machines in accordance with the principles of the present invention. System 10 includes an electromagnetically operated contactor relay 12 having actuating input coils 14 and 15 which alternately activate a plurality of polyphase contacts F or R to provide forward or reverse voltage in response to the application of push button switch inputs 16 or 18. That is, closure of forward switch 16 applies operating potential across coil 14 so as to close the contacts F of relay 12 to apply polyphase operating voltage to the associated induction machine (not shown). Conversely, closure of switch 18 closes contacts R so as to provide reverse operation of the associated induction machine.

Figure 2:
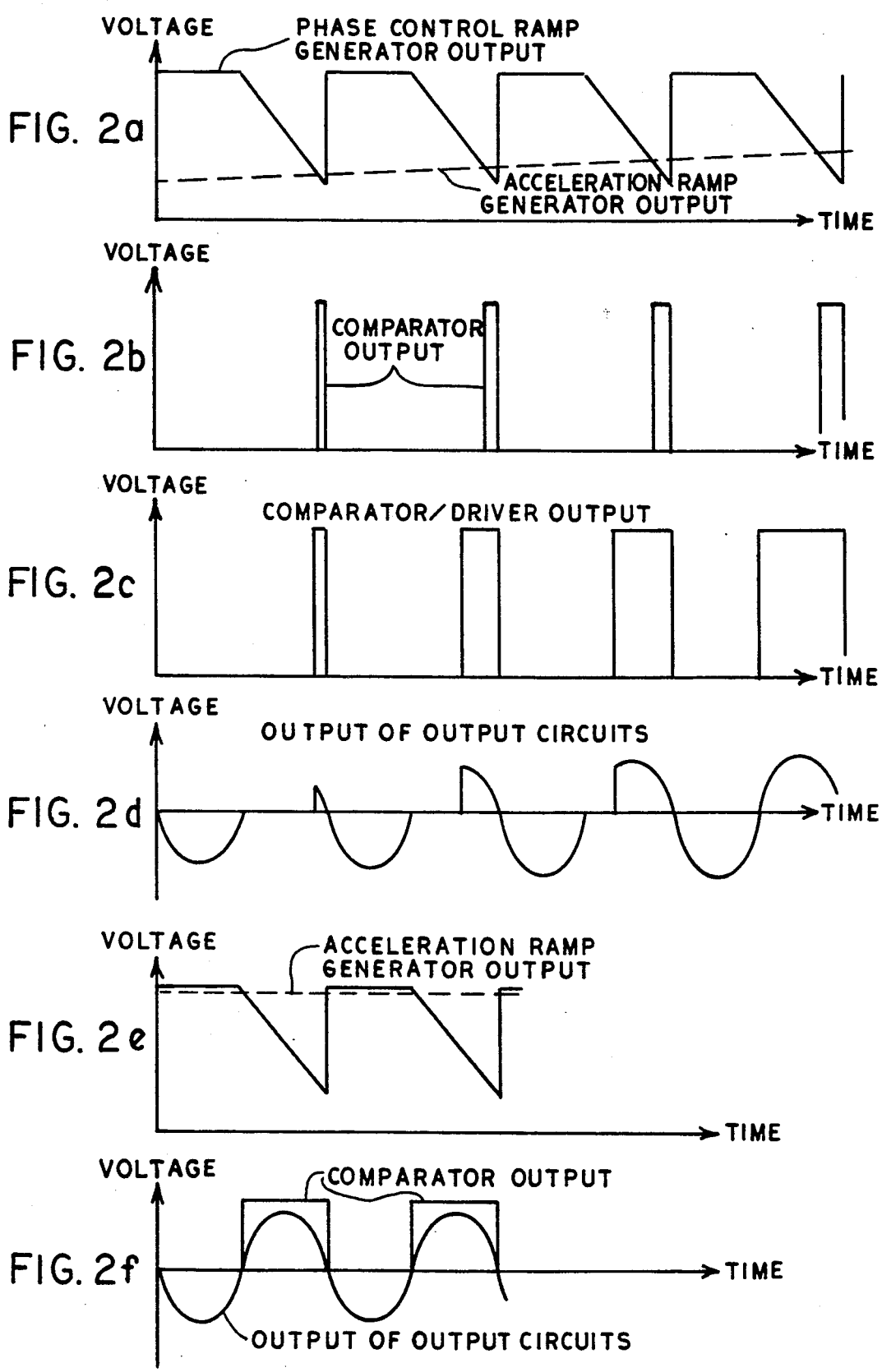
FIGS. 2a-2f are waveforms useful in explaining the operation of the system of FIG. 1 in accordance with the present invention; and, FIG. 3 is a schematic diagram of a preferred circuit for use in the system of FIG. 1.

Application of the control voltage across coils 14 or 15 also appears at input terminals A and B of an acceleration ramp generator 20. The output signal of ramp generator 20 gradually increases upon the initial application of the control voltage at terminals A or B and from a predetermined initial level as determined by the initial voltage setting reference 22. As explained more fully hereinafter, the input of acceleration ramp generator is electrically isolated from terminals A and B and therefore coils 14 and 15 by means of an opto coupler or any other suitable isolation device. Closing of the contacts F or R of contactor relay 12 also applies a control input to phase control ramp generators 24a, 24b and 24c. The outputs of phase control ramp generators 24a-24c provides an output signal which decreases from a given level during each positive half-cycle as illustrated in FIG. 2a. The gradually increasing output of acceleration ramp generator 20 is also illustrated in FIG. 2a. When the voltage of acceleration ramp generator 20 exceeds that of the respective phase control ramp generators 24a–24c, comparators 26a, 26b and 26c respectively provide an output signal, as illustrated in FIG. 2b, to driver circuits 28a, 28b and 28c.

The output of each driver circuit as illustrated in FIG. 2c is respectively applied to output circuits 30a, 30b and 30c. Driver circuits 28a–28c transfer the voltage to the output as shown in FIG. 2c and the output of the output circuits is illustrated in FIG. 2d. As the control input voltage is continuously applied to acceleration ramp generator 20, the output voltage of acceleration ramp generator 20 rises to the level as depicted in FIG. 2e. As illustrated in FIG. 2f, at this point in the operation of control system 10, the output of comparators 26a–26c is roughly 50 percent of the output versus time function. This output continues at its full wave AC output until the motor operator no longer depresses either the forward or reverse button. At that point the acceleration ramp generator output goes to zero whereupon the comparator output and therefore the output of drivers 28a–28c and output circuits 30a–30c also go to zero. Accordingly, the motor is no longer energized and begins to stop. After a short period of time, as determined by the drop-out time characteristics of relay 12, contacts F or R open. However, the output of output circuits goes to zero and therefore the motor operating voltage is completely removed from the load before the contacts of relay 12 opens. In one constructed embodiment, the drop-out time of the relay was on the order of 100 msec. whereas the turn-off time of control system 10 was on the order of 10 msec. Thereafter, this cycle is repeated whenever the forward or reverse control buttons are depressed.

As indicated with reference to FIG. 2e, the acceleration ramp generator output signal rises to a level as depicted in FIG. 2e. In one constructed embodiment, the time constants of ramp generator 20 were selected so that its output signal rises to the level indicated in FIG. 2e in approximately 10 seconds. It is believed that the total rise time can be selected between the range of 3 to 10 seconds for most crane trolley and conveyor applications. However, it should be noted that the total rise time can be selected to any desired valve to meet the needs of a given application.

It will be appreciated by those skilled in the art that since the input control circuit is isolated from system 10 by way of photo-diode transistors or photo-coupled isolators, the system is isolated from switching transients and undesired pulses associated with the actuating coils of relay 12. It will also be appreciated by those skilled in the art that the circuit of the present invention avoids contact arcing of relay 12 because the motor operating voltage is removed from the motor load before relay 12 drops out to open its contacts.

Figure 3:
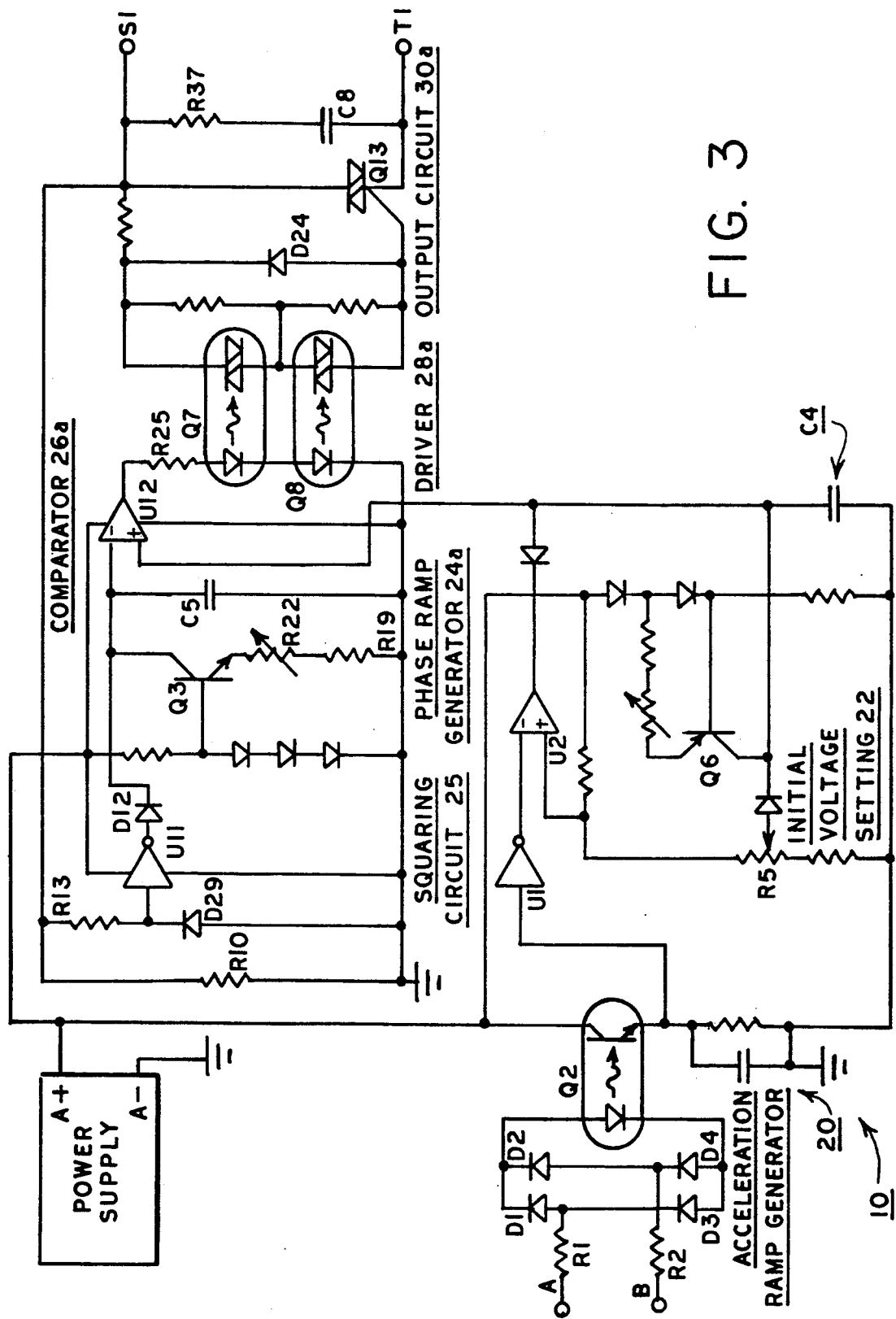

Referring now to FIG. 3, there is shown a schematic diagram of a preferred circuit for use in the system of FIG. 1. Since the three phase control circuits are essentially identical, the operation of control system 10 need only be described in conjunction with one of the three phase control circuits as illustrated in FIG. 3. The motor control inputs to the acceleration ramp generator 20 are provided at inputs A and B through resistors R1 and R2 and then through a rectifying and isolation circuit comprising diodes D1–D4. The rectified DC voltage is then applied to an opto coupler Q2 in order to isolate inputs A and B, and therefore the input coils of input 12, from control system 10. Opto coupler Q2 may take the form of the commercially known TIL119 device. The output of opto coupler Q2 is coupled through a pair of inverting gates U1 and U2. The output of the inverting gates controls the basic acceleration ramp generator circuit comprising a constant current source Q6 and charging capacitor C4. When the output of converter U2 goes positive, capacitor C4 is allowed to charge through the constant current source provided by Q6 and its associated circuitry. The output ramp generator signal provided across capacitor C4 starts at $t=0$ at an initial voltage as determined by initial voltage setting reference stage 22. Stage 22 comprises a potentiometer R5 which is coupled between the A+ voltage output of the power supply and A−, or the system ground. The initial voltage setting ensures a minimum amount of firing offset for applying operating voltage to the motor. Thus, the output across caapacitor C4 is a gradually increasing ramp signal whose initial value is determined by initial voltage setting stage 22. The output of capacitor C4 is applied as a first or "+" input to comparator 26a.

Output circuit 30A comprises a triac device Q13 whose main electrodes are serially coupled between the respective motor winding as at T1 and the respective contactor relay contact as at S1. The output of comparator 26a is coupled at the output resistor R25 thereof to a pair of stacked or serially coupled, light-triggered triacs Q7 and Q8. This then isolates the phase of the power appearing at S1 from system 10. Moreover, the isolation provided by triacs Q7 and Q8 also isolates each of the three phases from one another. Two such triacs are utilized to achieve a higher voltage rating than would be obtained if only one triac were used. The triacs Q7 and Q8 may take the form of the commercially known MOC 3021 currently manufactured by Motorola, Inc. The phase ramp generator 24a also derives its input signal from the phase of the power applied at lead S1. That phase of the motor operating voltage is applied to a squaring circuit 25 through resistor R13 cooperating with diode D29 and a Schmit trigger U11 which provides an output at diode D12. In currently preferred practice resistors R10 and R13 have a value on the order of 470K ohms. Thus, the relatively large impedance provided by resistors R10 and R13 effectively isolates or decouples S1 from system 10 and from the other two phases.

Squaring circuit 25 provides an output signal which controls the phase control ramp signal which, in turn, decreases from a given level during each positive half-cycle of the respective operating voltage phase. When the respective operating voltage phase is in its positive half-cycle, the output of Schmit trigger U11 is zero; and during the negative half-cycle the output of U11 is a "1" or positive voltage which changes a capacitor C5 of the phase ramp generator 24a to its full or maximum voltage value. The phase ramp generator 24a provides the gradually decreasing phase ramp generator signal by means of a constant current sinking or discharge device comprising transistor Q3 and resistors R22 and R19. That is, the constant current discharge circuit functions to discharge capacitor C5 during each positive half-cycle of that phase of the operating voltage when the output of U12 is zero. This decreasing ramp generator signal is applied as the second or "−" input to device U12 of comparator 26a which, in turn, provides an output signal when the level of the phase ramp generator signal is less than the level of the acceleration ramp generator signal applied at the other or "+" input of comparator 26a.

Referring again to output circuit 30a it can be seen that resistor R37 and capacitor C8 provide transient suppression across the output circuit. Further, diode D24 functions to trigger triac Q13 during each negative half cycle of the operating voltage applied to the motor by output circuit 30a. As previously discussed, control system 10 has a turn-offtime which is less than the drop-out characteristic time of contactor relay 12. When system 10 is turned off by removing the input signals A or B to acceleration ramp generator 20, diode D24 nevertheless functions to trigger triac Q13 during each negative half-cycle of the applied operating voltage. This, however, does not result in arcing of the relay contacts as only the negative half-cycles are applied to the load and, therefore, no current flows through the load or motor. In currently preferred practice, system 10 utilizes only one acceleration ramp generator, common to all three phases, in order to achieve uniform control of each voltage phase. Three separate phase control ramp generators are utilized because of the different temporal or angular relationships of the phases. What has been taught, then, is a control system for polyphase induction machines facilitating, notably, a soft-start or gradual acceleration and isolation of the system and elimination of contactor relay contact arcing. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A system for controlling the start-up sequence of a polyphase electric motor in response to a motor control input, said system comprising, in combination:

a motor control circuit for providing said motor control input;

means for supplying polyphase operating voltage to said motor;

a plurality of output circuits respectively coupled between said motor and said means for supplying voltage, each output circuit being responsive to an output control signal applied to an input thereof for applying said operating voltage to said motor;

an acceleration signal generator responsive to said motor control input for providing a first signal which gradually increases upon the initial application of said operating voltage;

a plurality of phase control signal generators respectively coupled to each phase of said operating voltage for providing a second output signal which decreases from a given level during each one of successive cycles of said phase of said operating voltage; and, a plurality of comparators with each comparator having first and second inputs respectively coupled to receive said first and second signals and each comparator having an output for respectively applying said output control signal to said input of each of said output circuits when said first signal is greater than said second signal, wherein said means for supplying polyphase operating voltage is a relay having means coupled to said motor control input for controlling said relay to apply and remove operating voltage from said motor, and wherein said relay has a given drop-out time which is greater than the time period required to reduce each said output control signal from its maximum value to a value which removes said operating voltage from said motor.

2. A control system for controlling the start-up sequence of a polyphase electric motor in response to a motor control input, said system comprising, in combination:

a motor control circuit for providing said motor control input;

means including a relay having an energizing coil coupled to said motor control input for supplying polyphase operating voltage to said motor and cooperating with said motor control circuit for both forward and reverse motor operations;

a plurality of output circuits respectively coupled between said motor and said means for supplying voltage, each output circuit being responsive to an output control signal applied to an input thereof for applying said operating voltage to said motor;

an acceleration signal generator responsive to said motor control input including means for providing a first signal which gradually increases upon the initial application of said operating voltage;

a plurality of phase control signal generators respectively coupled to each phase of said operating voltage for providing a second output signal which decreases from a given level during each one of successive cycles of said phase of said operating voltage;

said relay having a given drop-out time which is greater than the time period required to reduce each said output control signal from its maximum value to a value which removes said operating voltage from said motor; and a plurality of comparators with each comparator having first and second inputs respectively coupled to receive said common first signal and said second signals and each comparator having an output for respectively applying said output control signal to said input of each of said output circuits when said first signal is greater than said second signal.

3. A control system for controlling the start-up sequence of a polyphase electric motor in response to a motor control input, said system comprising, in combination:

a motor control circuit for providing said motor control input;

means including a relay having an energizing coil coupled to said motor control input for supplying polyphase operating voltage to said motor and cooperating with said motor control circuit for both forward and reverse motor operations;

a plurality of output circuits respectively coupled between said motor and said means for supplying voltage, each output circuit being responsive to an output control signal applied to an input thereof for applying said operating voltage to said motor;

an acceleration signal generator responsive to said motor control input including means for providing a first signal which gradually increases upon the initial application of said operating voltage;

said acceleration signal generator including means for electrically decoupling said acceleration signal generator from said motor control input wherein said acceleration signal generator provides said first signal in response to the energizing of said coil while electrically isolating said acceleration signal generator from said coil;

a plurality of phase control signal generators respectively coupled to each phase of said operating voltage for providing a second output signal which decreases from a given level during each one of successive cycles of said phase of said operating voltage; and a plurality of comparators with each comparator having first and second inputs respectively coupled to receive said common first signal and said second signals and each comparator having an output for respectively applying said output control signal to said input of each of said output circuits which said first signal is greater than said second level.

4. The system according to claim 3, wherein said means for decoupling includes an opto-coupler device which provides an output transition triggered by light illumination thereon in response to an electrical input signal provided by said motor control input.

5. A control system for controlling the start-up sequence of a polyphase electric motor in response to a motor control input, said system comprising, in combination:

a motor control circuit for providing said motor control input;

means including a relay having an energizing coil coupled to said motor control input for supplying polyphase operating voltage to said motor and cooperating with said motor control circuit for both forward and reverse motor operations;

a plurality of output circuits respectively coupled between said motor and said means for supplying voltage, each output circuit being responsive to an output control signal applied to an input thereof for applying said operating voltage to said motor;

an acceleration signal generator responsive to said motor control input including means for providing a first signal which gradually increases upon the initial application of said operating voltage;

a plurality of phase control signal generators respectively coupled to each phase of said operating voltage for providing a second output signal which decreases from a given level during each one of successive cycles of said phase of said operating voltage;

a plurality of comparators with each comparator having first and second inputs respectively coupled to receive said common first signal and said second signals and each comparator having an output for respectively applying said output control signal to said input of each of said output circuits when said first signal is greater than said second signal; and, said comparators being electrically isolated from said output circuits by way of an opto coupler device respectively coupled between the output of each comparator and said output circuits.

6. The system according to claim 5, wherein said motor is a 3-phase induction motor having a squirrel-cage rotor and wherein said polyphase voltage is a 3-phase voltage.

7. A control system for controlling the start-up sequence of a polyphase electric motor in response to a motor control input, said system comprising, in combination:

a motor control circuit for providing said motor control input;

means including a relay having an energizing coil coupled to said motor control input for supplying polyphase operating voltage to said motor and cooperating with said motor control circuit for both forward and reverse motor operations;

a plurality of output circuits respectively coupled between said motor and said means for supplying voltage, each output circuit being responsive to an output control signal applied to an input thereof for applying said operating voltage to said motor;

an acceleration signal generator response to said motor control input including means for providing a first signal which gradually increases upon the initial application of said operating voltage;

said acceleration signal generator including a ramp generator which includes an initial voltage offset circuit wherein the initial level of said first signal is a predetermined valve greater than zero;

a plurality of phase control signal generators respectively coupled to each phase of said operating voltage for providing a second output signal which decreases from a given level during each one of successive cycles of said phase of said operating voltage;

a plurality of comparators with each comparator having first and second inputs respectively coupled to receive said common first signal and said second signals and each comparator having an output for respectively applying said output control signal to said input of each of said output circuits when said first signal is greater than said second signal;

each output circuit including a triac device having first and second main electrodes serially coupled between said motor and said means for supplying voltage and said triac device having a control gate input electrode coupled to the output of the corresponding comparator; and each control gate input electrode begin coupled to said corresponding comparator by an opto coupler which respectively electrically isolates the corresponding comparator from said output circuits.

* * * * *